No. 889,839. PATENTED JUNE 2, 1908.
J. WILKINSON.
SELF PROPELLED VEHICLE.
APPLICATION FILED MAR. 11, 1904.

4 SHEETS—SHEET 1.

WITNESSES:

INVENTOR
John Wilkinson
BY
Hey & Parsons
ATTORNEYS

No. 889,839. PATENTED JUNE 2, 1908.
J. WILKINSON.
SELF PROPELLED VEHICLE.
APPLICATION FILED MAR. 11, 1904.

4 SHEETS—SHEET 2.

WITNESSES:
Chas. J. Foner.
Chas. H. Young

INVENTOR
John Wilkinson
BY
Hey & Parsons
ATTORNEYS

No. 889,839. PATENTED JUNE 2, 1908.
J. WILKINSON.
SELF PROPELLED VEHICLE.
APPLICATION FILED MAR. 11, 1904.

4 SHEETS—SHEET 3.

WITNESSES:
Chas. J. Foner.
Chas H. Young.

INVENTOR
John Wilkinson
BY
Hey & Parsons
ATTORNEYS

No. 889,839. PATENTED JUNE 2, 1908.
J. WILKINSON.
SELF PROPELLED VEHICLE.
APPLICATION FILED MAR. 11, 1904.
4 SHEETS—SHEET 4.
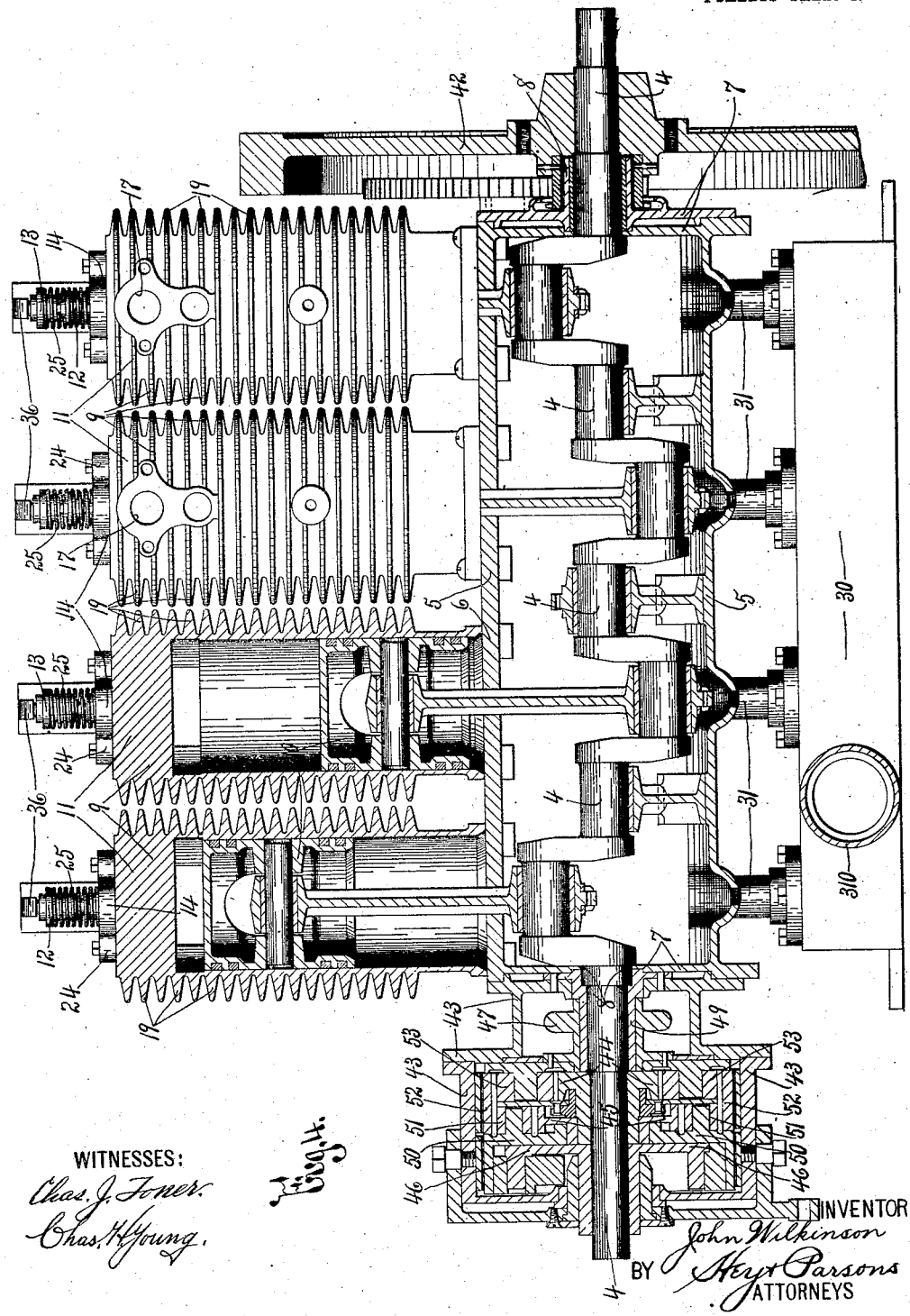
WITNESSES:
Chas. J. Toner.
Chas. H. Young.
INVENTOR
John Wilkinson
BY Hoyt Parsons
ATTORNEYS

UNITED STATES PATENT OFFICE.

JOHN WILKINSON, OF SYRACUSE, NEW YORK, ASSIGNOR TO H. H. FRANKLIN MANUFACTURING COMPANY, OF SYRACUSE, NEW YORK, A CORPORATION OF NEW YORK.

SELF-PROPELLED VEHICLE.

No. 889,839.   Specification of Letters Patent.   Patented June 2, 1908.

Application filed March 11, 1904. Serial No. 197,664.

*To all whom it may concern:*

Be it known that I, JOHN WILKINSON, of Syracuse, in the county of Onondaga and State of New York, have invented a certain new and useful Self-Propelled Vehicle, of which the following is a specification.

My invention relates to self-propelled vehicles of the explosion-motor type, and one of the primary objects thereof is to provide a construction and arrangement of parts which effects a maximum efficiency in driving the vehicle, or automobile.

A further object of the invention is to provide compact and highly efficient means, particularly applicable to automobiles or motor-car constructions for supplying the power-generating medium to the mechanism utilizing the same, and for disposing of the waste after this medium has performed its function.

Other objects of the invention will appear, and the many advantages of the same be appreciated, as the vehicle is more fully disclosed.

To effect the objects sought, the invention includes the combination and arrangement of the component parts to be hereinafter set forth and particularly pointed out in the claims.

In describing this invention, reference is had to the accompanying drawings in which like characters designate corresponding parts in all the views.

Figure 1:
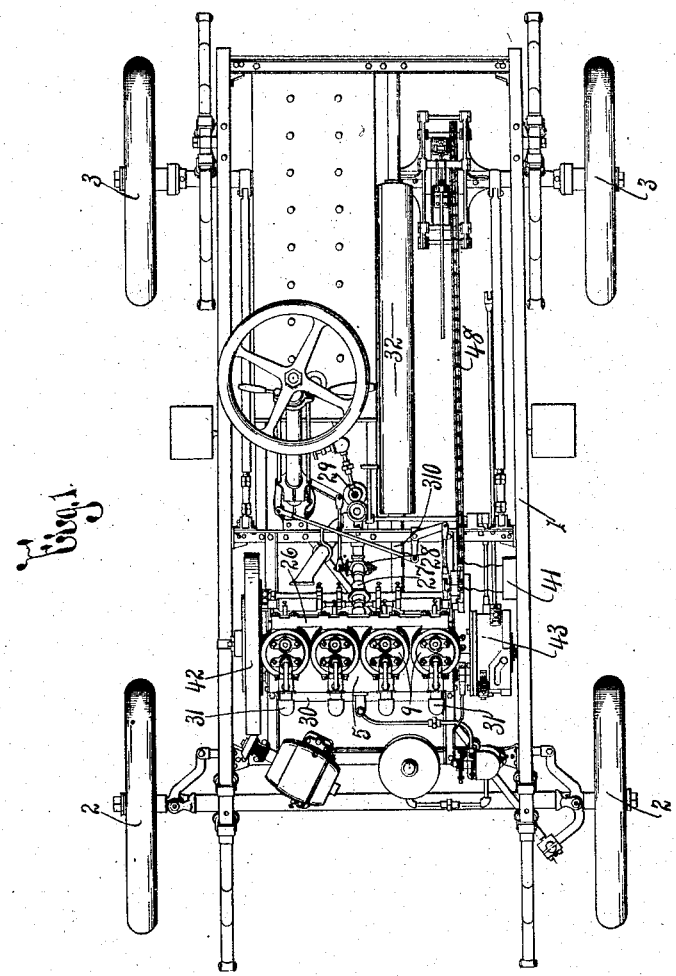
Figure 2:
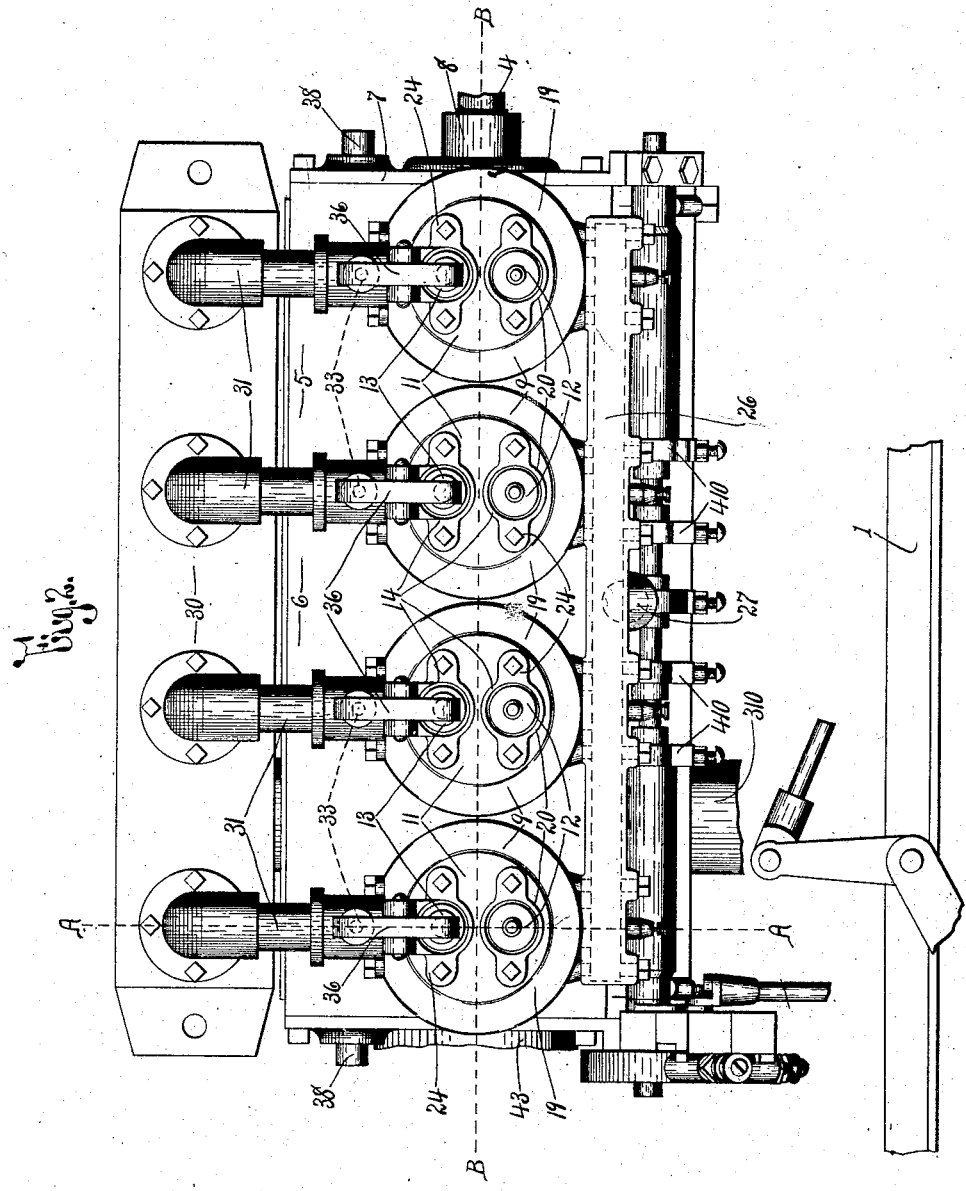
Figure 3:
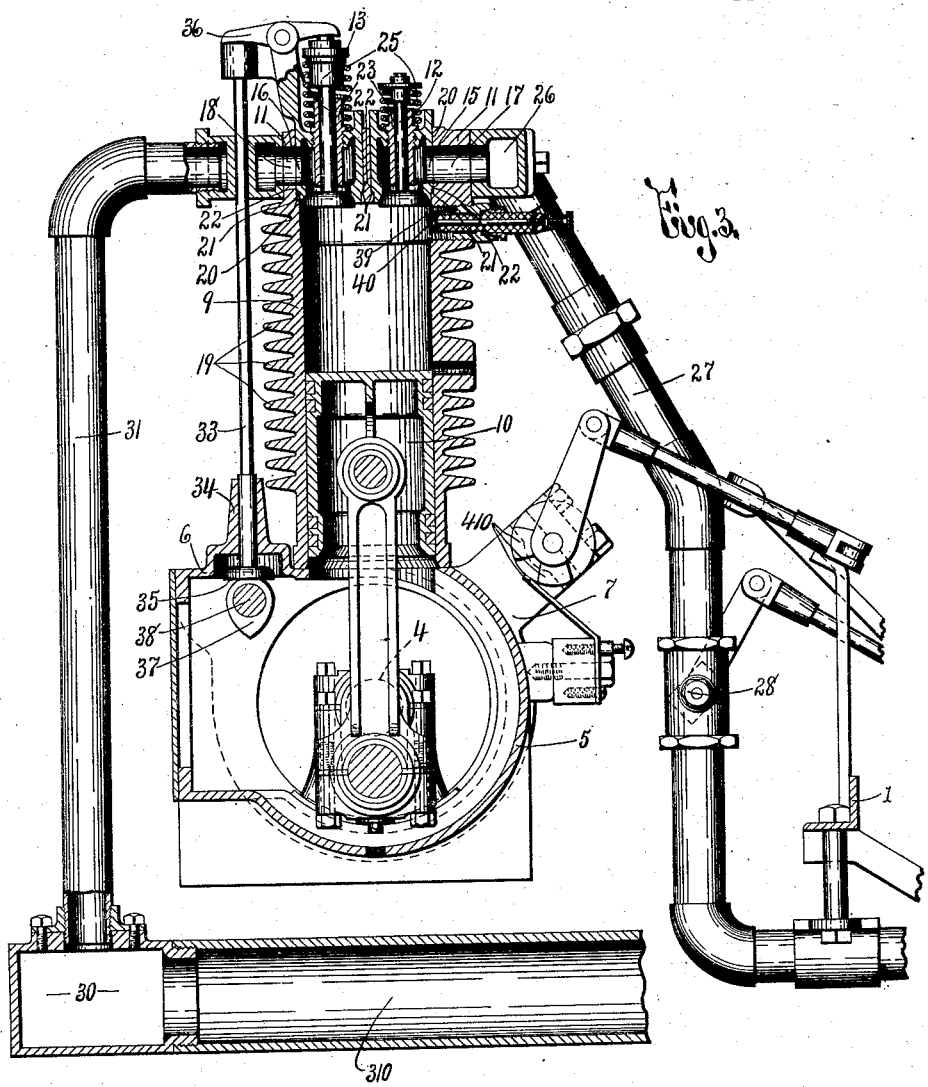

Figure 1 is a top plan of a self-propelled vehicle embodying one construction of my invention, the usual body being omitted, and a support for a single occupant being shown at the rear of the steering wheel. Fig. 2 is a top plan of the motor or engines, and contiguous parts. Figs. 3 and 4 are vertical sectional views taken ion lines A—A and B—B, Fig. 2.

In the illustrated embodiment of my invention, 1 designates the frame of an automobile or motor-car, 2 the front supporting wheels, and 3 the rear or driving wheels, said frame and wheels and the connections between the same comprising a running gear.

The type of power-generating mechanism shown in the accompanying drawings comprises a battery of vertically-disposed four-cycle explosive engines arranged side by side in a rectilinear line at the front portion of the vehicle and supported preferably by the frame 1. The cranks of the engines are usually carried by a common shaft 4, are arranged with the outer cranks balancing the inner cranks, and are inclosed by a casing 5 common to all of the engines, and comprising a top side or wall 6, a bottom wall, and side or end heads 7 provided with bearings 8, in which the crank-shaft 4 is journaled. The cylinders 9 of the engines are air-cooled and preferably unjacketed, are equidistantly spaced from each other, are supported upon the top 6 of the casing 5, and are each preferably provided with laterally-projecting flanges at their lower ends through which suitable fastening means extend to securely bolt the same to the top 6. Pistons 10 of any desirable construction are movable in the cylinders 9 and suitably connected to the cranks of the shaft 4.

The areas of the external and internal surfaces of each cylinder, are so relatively proportioned that undue heating of the walls thereof is prevented during the use of the automobile, even though the same is propelled at high speed. To this end, the internal surface of each cylinder is reduced to a minimum, and the external surface is increased to a maximum. The reduction of the internal surfaces of the cylinders is greatly facilitated by arranging the inlet- and exhaust-ports thereof substantially lengthwise of the cylinders with their inner ends in line with the piston-chambers and opening directly therefrom, thus avoiding the presence of lateral, or other, extensions of the piston-receiving chambers to provide conduits for the incoming and outgoing gases, and rendering it possible to form said chambers as illustrated of substantially uniform diameter from end to end, and with a minimum space in the cylinders above or beyond the limit of the compressing strokes of the pistons. The desired difference between the areas of the internal and external surfaces of the cylinders is further facilitated by forming the main portions of the heads 11 of the cylinders integral with the sides thereof, by supporting the inlet-and exhaust-valves 12 13 in casings 14 removably secured to said main portions and having openings 15 16 in their sides connected to inlet-and exhaust- passages 17 18 in the main portions of the heads 11, and by providing the peripheries of said heads and sides of the cylinders with encircling radiating projections 19.

An inlet-chamber 26 is connected to an inlet-conduit 27 provided with a throttle-valve 28, and with suitable means, as a carbureter 29, for supplying explosive mixture, and is supported crosswise of the upper ends of the cylinders 9 at one side thereof by any desirable means, as bolts engaged with the cylinders 9. The upright wall of the chamber 26 adjacent to the cylinders 9 is provided with a plurality of openings or passages communicating, respectively, with the inlet-openings or passages 17 of the cylinder-heads 11. An exhaust-chamber 30 is arranged at the opposite side of, and below, the cylinders 9 and is respectively connected by pipes or passages 31 to the exhaust-passages 18 of the cylinder-heads 11. Said chamber 30 discharges into a single conduit 310 provided with a muffler 32.

The explosion of the charges fed to the cylinders is effected by any desirable means, here shown as electrodes 39 40, removably held in the upper ends of the cylinders and connected by electric conductors, not illustrated, to a spark-coil 41, and to make and break mechanism 410 not necessary to describe herein, said spark-coil and make and break mechanism being connected independently to the respective cylinders for controlling the explosions therein.

One end of the crank-shaft 4 projects beyond the casing 5 and is provided with a fly-wheel 42, and the opposite end thereof, Fig. 4, is extended beyond the casing 5 into a shell 43 fixed to the casing 5, and forming the inclosing casing of a power-transmitting mechanism or transmission gearing similar to that shown, described and claimed in my pending application, Serial No. 121,454, filed Aug. 29, 1902. The end of the shaft 4 within the shell 43, forms the driving member of the mechanism for transmitting motion to the driving wheels 3, and is provided with members 44, 45, 46, fixed thereto and serving to transmit motion to as procket-wheel 47 forming a driven member, which is connected by a chain 48, or other transmitting means, to the driving wheels 3, is mounted on a hub 49 fixed to the casings 5, 43, and is movable on an axis substantially coincident with that of the crank-shaft. A member 50 arranged concentric with the axis of the shaft 4 and the members 44, 45, 46, is supported indirectly on the end of the shaft 4 within the shell 43, is locked at will to the member 46, and carries pinions 51 engaging with the member 45 and with a loose internal gear 52 supported indirectly on the shaft 4 and also engaging pinions 53 carried by a part fixed to the driven member 47. Said members 50 52 supported by the shaft 4, and the members 47 and 53, revolve at different speeds than said shaft and the members 44, 45, 46, fixed thereto, for revolving the driven member 47 in different directions and at a plurality of speeds. It is thought unnecessary to herein describe in detail the construction and operation of said power-transmitting mechanism, since the same forms no part of my present invention.

A particular advantage of my vehicle is that by the use of a battery of engines or cylinders, as shown and described, each cylinder propels only its proportionate amount of the total weight, or in other words, performs but a part of the work which would be required of the cylinder if the motor contained but one. Moreover, the motor of my vehicle may be run at a lower speed, and with greater intervals between the explosions in any one of the cylinders, than would be the case if the motor included but a single cylinder only, and was developing equal power. Consequently, a maximum time is afforded for the disposal of the heat absorbed during the power-stroke.

In the practical use of my vehicle, the throttle-valve is arranged to restrict the supply of explosive mixture so that the average charge is under the maximum capacity of the motor or engines and, consequently, the motor is ordinarily used much below its greatest capability, but when desired, the maximum charge may be supplied, and the power developed will be greatly increased, thus rendering the motor or engine highly flexible and adding to the practicability and efficiency of my vehicle. Moreover, the work required of the power-generating mechanism of a standard commercial self-propelled vehicle, even if used only as a passenger runabout is such, that providing the mechanism contains only a single cylinder, it is impossible to cool the cylinder, if of the constructions heretofore devised, unless a circulating cooling medium, as water, or an auxiliary cooling means, as a fan, are used, but by utilizing a number of cylinders as described capable of generating an aggregate power greater than that desired, a particularly practical mechanism is obtained, the cylinders of which can be cooled by air and without the use of a circulating cooling medium, as water.

My invention presents for the first time in the art a vehicle including an explosion four-cycle motor for propelling the same, having a plurality of cylinders cooled by air even though the automobile is driven at a high speed, and as is obvious, such a vehicle dispenses with the use of water containing jackets, a water-cooling medium and circulating medium and circulating means therefor, thus augmenting the simplicity and efficiency of the vehicle, reducing to a minimum the liability of cold temperatures interfering with the use thereof, and decreasing the attention and care necessary in propelling the same, and the weight thereof.

The construction and operation of my vehicle will now be readily understood upon reference to the foregoing description and the accompanying drawings, and it will be particularly noted that more or less changes may be made in the component parts thereof, without departing from the spirit of my invention.

Having thus fully described my invention, what I claim as new and desire to secure by Letters Patent, is:—

1. In a vehicle, the combination of the running gear, an internal-combustion engine provided with a plurality of air-cooled cylinders and with pistons movable therein, and a crank-shaft common to all of the cylinders, the cylinders being arranged side by side lengthwise of said shaft and in substantially upright planes at the front of the running gear, and each being provided with external radiating projections, and power-transmitting means connecting the running gear and the engine for propelling the vehicle substantially as and for the purpose described.

2. In a vehicle, the combination of the running gear, an internal-combustion engine provided with a plurality of air-cooled cylinders and with pistons movable therein, a crank-shaft common to all of the cylinders, the cylinders being arranged side by side lengthwise of said shaft and in substantially upright planes at the front of the running-gear, and each being provided with external radiating projections, and a single inlet passage connected independently to the cylinders, and power-transmitting means connecting the running gear and the engine for propelling the vehicle, substantially as and for the purpose described.

3. In a vehicle, the combination of the running gear, an internal-combustion engine provided with a plurality of air-cooled unjacketed cylinders and with pistons movable therein, a crank shaft common to all of the cylinders the cylinders being arranged side by side lengthwise of said shaft and in substantially upright planes at the front of the running gear, and a single inlet-passage connected independently to the cylinders; and power-transmitting means connecting the running gear and the engine for propelling the vehicle, substantially as and for the purpose specified.

4. In a motor-vehicle of the explosion-motor type, the combination of the running gear, a battery of engines arranged at the front of the running gear, including a casing common to all of the engines, air-cooled vertically-arranged cylinders supported upon the top of the casing, and each provided with external radiating projections, a crank-shaft journaled in the casing, and connections between the pistons of the engines and the shaft, and power-transmitting mechanism interposed between the running gear and the shaft for propelling the vehicle, substantially as and for the purpose set forth.

5. In a motor-vehicle of the explosion-motor type, the combination with a frame and supporting wheels; of a battery of engines arranged in a rectilinear line across a front portion of the frame, including a casing common to all of the engines, equidistantly-spaced vertically-arranged cylinders supported upon the top of the casing, each of said cylinders being unjacketed and provided with external radiating projections, a crank-shaft journaled in the ends of the casing, and connections between the pistons of the engines and the shaft, and transmitting-mechanism interposed between the shaft and the wheels, substantially as and for the purpose described.

6. In a motor-vehicle of the explosion-motor type, the combination with a frame and supporting wheels; of a battery of engines having vertically-disposed cylinders arranged in a line at the front portion of the frame, an inlet-chamber common to all of the cylinders arranged at one side of the cylinders and having separate connections therewith, means for supplying explosive mixture to the chamber, and a crank-shaft driven by the pistons of the engines, and means for transmitting the movement of said shaft to the wheels, substantially as and for the purpose specified.

7. In a motor-vehicle of the explosion-motor type, the combination with a frame and supporting wheels; of a battery of engines having vertically-disposed cylinders arranged in a line at the front portion of the frame, means at one side of the cylinders for supplying an explosive mixture, said means having separate connections with the cylinders, means at the other side of the cylinders for receiving the exhaust gases, said means also having separate connections with the cylinders, and a crank-shaft driven by the pistons of the engines, and means for transmitting motion of said shaft to the wheels, substantially as and for the purpose specified.

8. In a motor-vehicle of the explosion-motor type, the combination with a frame and supporting wheels; of a battery of engines having vertically-disposed cylinders arranged in a line at the front portion of the frame, an inlet-chamber common to all of the cylinders arranged at one side of the cylinders and having separate connections therewith, means for supplying explosive mixture to the chamber, an exhaust-chamber common to all of the cylinders arranged at the other side of the cylinders, and a crank-shaft driven by the pistons of the engines, and means for transmitting motion of said shaft to the wheels, substantially as and for the purpose set forth.

9. In a motor-vehicle of the explosion-motor type, the combination with the running gear, of a battery of engines having vertically-disposed air-cooled cylinders arranged in a line at the front portion of the running gear, each cylinder having its cylindrical wall provided with external radiating projections, and having its cylindrical wall and the main portion of its head formed integral, and its head provided with removable means including inlet and exhaust ports, and valves for controlling the flow through said ports, and a crank-shaft common to all of the cylinders, and power-transmitting means connecting the crank-shaft and the running gear for propelling the vehicle, substantially as and for the purpose set forth.

10. In a motor-vehicle of the explosion-motor type, the combination with a frame and supporting wheels; of a battery of engines comprising a casing supported by the frame and including a top wall and end walls, vertically-disposed cylinders arranged side by side lengthwise of the casing supported at their lower ends on the top wall of the latter, and having heads with openings therethrough extending lengthwise of the cylinders and having side walls with internal and external surfaces relatively proportioned to prevent undue heating, two sets of valve-mechanisms in said openings, means for supplying an explosive mixture to the cylinders controlled by one set of said valve-mechanisms, means for receiving the exhaust from the cylinders controlled by the other set of valve-mechanisms, and a crank-shaft journaled in the end walls of the casing, and means for transmitting the movement of said shaft to the wheels, substantially as and for the purpose described.

11. In a motor-vehicle of the explosion-motor type, the combination with a frame and supporting wheels, of a battery of engines having vertically-disposed cylinders arranged in a line at the front portion of the frame, each cylinder having its cylindrical wall provided with external radiating projections, and having its cylindrical wall and the main portion of its head formed integral, and its head provided with removable means including inlet and exhaust ports, and valves for controlling the flow through said ports, means at one side of the cylinders for supplying an explosive mixture, said means having separate connections with the respective inlet ports of the cylinders, means at the other side of the cylinders for receiving the exhaust gases, said means having separate connections with the respective exhaust ports of the cylinders, and a crank-shaft driven by the pistons of the engines, and means for transmitting motion of said shaft to the wheels, substantially as and for the purpose described.

12. In a vehicle, the combination of the running gear, an internal-combustion engine provided with a plurality of air-cooled cylinders and with pistons movable therein, the cylinders being arranged side by side in substantially upright planes at the front of the running gear, a single inlet-pipe, a throttle-valve, and a muffler; with a spark-coil and make and break mechanism, each connected independently to the respective cylinders, and power-transmitting means connecting the running gear and the engine for propelling the vehicle, substantially as and for the purpose specified.

13. In a vehicle, the combination of the running gear and an internal-combustion engine having a crank-shaft and pistons connected thereto; with a transmission-gearing having members differentially-revoluble by the crank-shaft on an axis coincident with that of said shaft, and power-transmitting means connecting the running gear and the driven member of the transmission-gearing, substantially as and for the purpose set forth.

14. In a vehicle, the combination of the running gear and an internal-combustion engine having a frame, a crank-shaft journaled in the frame and having its ends extended beyond the same, and pistons connected to the crank-shaft; with a fly-wheel supported on one end of the crank shaft, a transmission gearing connected to the other end of the crank-shaft and having members differentially-revoluble by the crank-shaft on an axis coincident with that of said shaft, and power-transmitting means connecting the running gear and the driven member of the transmission-gearing, substantially as and for the purpose specified.

15. In a vehicle, the combination of the running gear and an internal-combustion engine having a frame, a crank-shaft journaled in the frame and having its ends extended beyond the same, and pistons connected to the crank-shaft; with a fly-wheel supported on one end of the crank-shaft, a transmission-gearing comprising a frame fixed to the frame of the engine, and members encircling the other end of the crank-shaft and revoluble thereby on an axis coincident with that of said shaft, and power-transmitting means connecting the running gear and a revoluble member of the transmission-gearing, substantially as and for the purpose described.

In testimony whereof, I have hereunto signed my name in the presence of two attesting witnesses at Syracuse, in the county of Onondaga, in the State of New York, this 10th day of March, 1904.

JOHN WILKINSON.

Witnesses:
D. LAVINE,
B. CARTWRIGHT.